(12) United States Patent
Gharpure et al.

(10) Patent No.: US 10,698,817 B2
(45) Date of Patent: Jun. 30, 2020

(54) METHOD FOR DETERMINING AVAILABLE STORED ENERGY CAPACITY AT A POWER SUPPLY AND SYSTEM THEREFOR

(71) Applicant: DELL PRODUCTS, LP, Round Rock, TX (US)

(72) Inventors: Padmanabh R. Gharpure, Round Rock, TX (US); Mark A. Muccini, Georgetown, TX (US); Lei Wang, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 280 days.

(21) Appl. No.: 15/620,286

(22) Filed: Jun. 12, 2017

(65) Prior Publication Data

US 2018/0356876 A1 Dec. 13, 2018

(51) Int. Cl.
*G06F 12/0804* (2016.01)
*H02M 1/42* (2007.01)
*H02M 7/06* (2006.01)
*G06F 1/26* (2006.01)

(52) U.S. Cl.
CPC ............ *G06F 12/0804* (2013.01); *G06F 1/26* (2013.01); *H02M 1/4208* (2013.01); *H02M 1/4225* (2013.01); *H02M 7/06* (2013.01)

(58) Field of Classification Search
CPC .... G06F 1/3243; G06F 1/3296; G06F 1/3287; G06F 12/0804; G06F 1/3275; G06F 2212/621; H02M 1/4225; H02M 7/06

USPC ................................................. 324/425–437
See application file for complete search history.

(56) References Cited

U.S. PATENT DOCUMENTS

| | | | | |
|---|---|---|---|---|
| 2004/0162922 | A1* | 8/2004 | Kardach | G06F 1/3203 710/15 |
| 2010/0014330 | A1* | 1/2010 | Chang | H02M 1/4225 363/89 |
| 2014/0095917 | A1* | 4/2014 | Richards, III | G06F 1/3203 713/340 |
| 2014/0265606 | A1* | 9/2014 | Gazit | H02J 7/0018 307/82 |
| 2015/0171664 | A1* | 6/2015 | Liu | H02J 9/061 307/64 |
| 2015/0279463 | A1 | 10/2015 | Berke | |
| 2016/0188414 | A1* | 6/2016 | Jayakumar | G06F 12/0804 711/103 |
| 2017/0031402 | A1 | 2/2017 | Muccini et al. | |
| 2017/0038812 | A1 | 2/2017 | Muccini et al. | |
| 2017/0302215 | A1* | 10/2017 | Jing | H02P 6/182 |

\* cited by examiner

*Primary Examiner* — Jeff W Natalini
(74) *Attorney, Agent, or Firm* — Larson Newman, LLP

(57) ABSTRACT

A method includes measuring an initial voltage a bulk capacitor at a power supply, controlling a power factor correction circuit to disable charging of the bulk capacitor for a predetermined period of time, and measuring a final voltage at the bulk capacitor at completion of the period of time. The method further includes measuring a first average power provided to a load receiving power from the voltage converter, the load external to the power supply, and determining a capacitance of the bulk capacitor based on the initial voltage, the final voltage, and the first average power.

19 Claims, 4 Drawing Sheets

METHOD FOR DETERMINING AVAILABLE STORED ENERGY CAPACITY AT A POWER SUPPLY AND SYSTEM THEREFOR

FIELD OF THE DISCLOSURE

The present disclosure generally relates to information handling systems, and more particularly relates to determining an available stored energy capacity at a power supply.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems.

SUMMARY

A method includes measuring an initial voltage at a bulk capacitor of a power supply, controlling a power factor correction circuit to disable charging of the bulk capacitor for a predetermined period of time, and measuring a final voltage at the bulk capacitor at completion of the period of time. The method further includes measuring a first average power provided to a load receiving power from the voltage converter, the load external to the power supply, and determining a capacitance of the bulk capacitor based on the initial voltage, the final voltage, and the first average power.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

Figure 1:
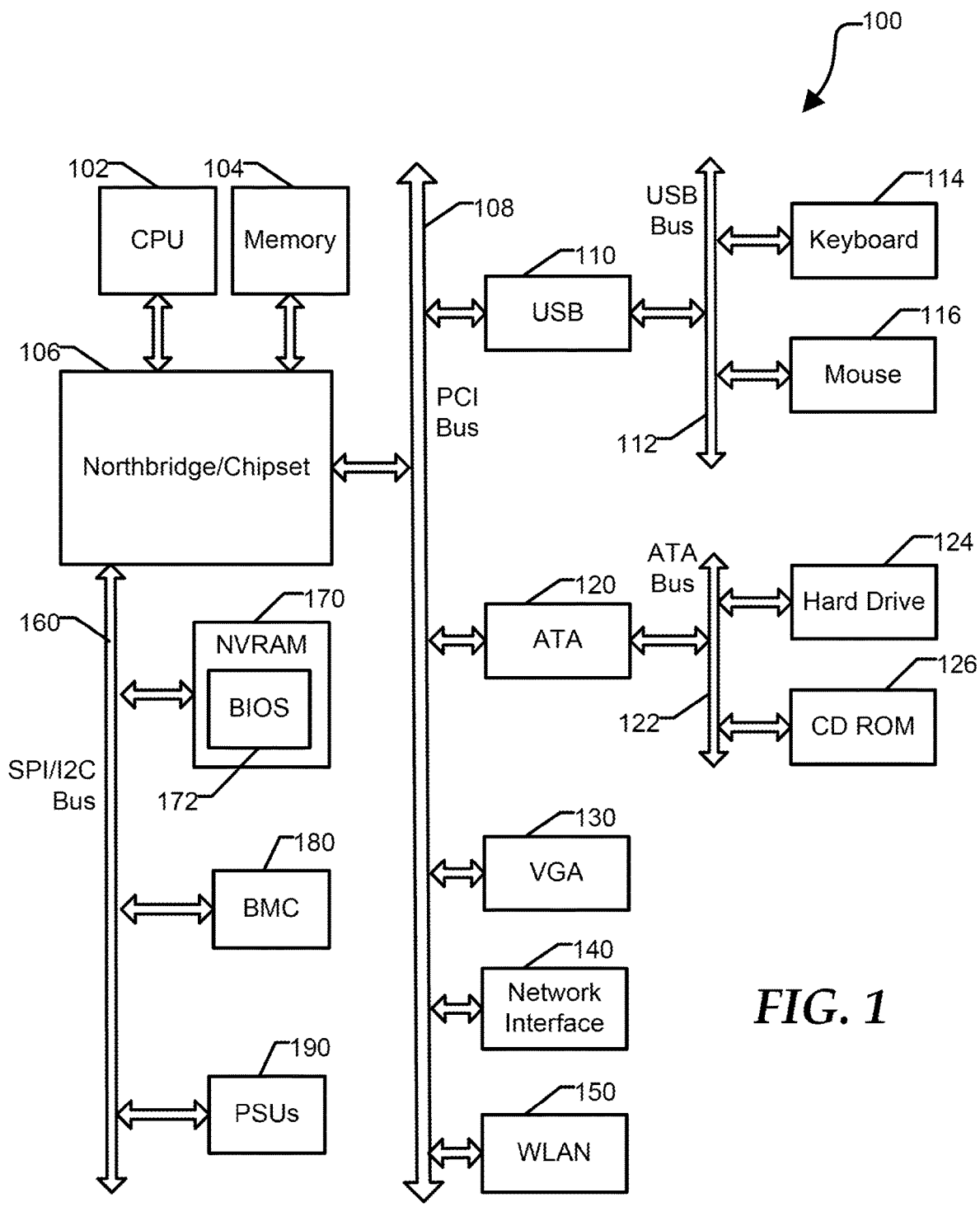
FIG. 1 is a block diagram of an information handling system according to a specific embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

An information handling system can include a power supply to convert mains electric power, such as alternating-current received at homes and businesses, to direct-current at particular voltage and current levels needed to power components of the information handling system. Mains power can exhibit momentary interruptions, voltage fluctuations, or extended outages. A typical power supply includes a capacitor that is capable of storing energy so that the power supply can continue to provide power to the information handling system during momentary drop-outs of mains power or for a brief period of time following interruption of mains power. The period of time that a power supply can continue to provide sufficient power to the components of the information handling system following an interruption in mains power, referred to herein as hold-up time, is determined based on a size of the energy storage capacitor included in the power supply, current consumed by the information handling system, the energy conversion efficiency of the power supply, and other parameters. For example, a power supply can be designed to provide specified power delivery levels throughout the duration of a mains power interruption of one-half cycle, e.g. ten milliseconds. Unfortunately, due to component tolerances and age-related degradation, the hold-up time of a power supply is usually estimated and is typically based on worst-case tolerances of the energy storage capacitor.

It can be advantageous to know how much energy is stored in the power supply capacitor. For example, if mains power is known to exhibit interruptions or brown-outs of a particular duration, the power consumption and computational performance of an information handling system can be adjusted so that the power supply is capable of maintaining power to the system throughout the interruption. The duration of a mains power interruption can't be predicted or known, however PSUs are typically designed to ride through interruption of 10 ms to 20 ms at rated capacity. The actual ride through time may degrade over time. For example, the capacitance provided by an energy storage capacitor included in the PSU can decrease over time due to dielectric deterioration and the like. Techniques disclosed herein can be used to determine an actual capacitance of the energy storage capacitor at a particular time, which can be used to determine how much energy is available in the capacitor to supply power to the information handling system during a mains power disruption. In addition, an information handling system can take advantage of the residual energy within the power supply to save data that would otherwise be lost when the voltage level provided by the power supply fall below critical levels. For example, a write-back cache architecture can improve computational efficiency by delaying the updating of system memory with new data currently stored in a cache memory. In the event of a mains power failure, the information handling system can utilize energy remaining in the power supply to flush data stored in the caches to persistent memory. If the actual available hold-up energy of a power supply can be accurately determined, the information handling system can use this information to fine-tune architectural configuration, such as cache-flush capacity, to optimize computational performance. FIGS. 1-5 illustrate techniques for determining the hold-up energy of a power supply.

FIG. 1 illustrates an information handling system 100 including a processor 102, a memory 104, a northbridge/chipset 106, a PCI bus 108, a universal serial bus (USB) controller 110, a USB 112, a keyboard device controller 114, a mouse device controller 116, an ATA bus controller 120, an ATA bus 122, a hard drive device controller 124, a compact disk read only memory (CD ROM) device controller 126, a video graphics array (VGA) device controller 130, a network interface controller (MC) 140, a wireless local area network (WLAN) controller 150, a serial peripheral interface (SPI)/I2C bus 160, a NVRAM 170, a baseboard management controller (BMC) 180, and one or more power supply units (PSUs) including PSU 190. NVRAM 170 can store BIOS 172.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One ore more components can be integrated together. For example, portions of northbridge/chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, i.e. a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

BMC 180 can be configured to provide out-of-band access to devices at information handling system 100. As used herein, out-of-band access refers to operations performed independent of an operating system executing at system 100, including operations performed prior to execution of BIOS 172 by processor 102 to initialize operation of system 100. In an embodiment, BMC 180 can be compliant with Intel Active Management Technology (AMT). AMT is hardware and firmware technology to provide remote out-of-band management of system 100.

PSUs 190 can include one or more energy conversion devices configured to convert mains power to voltage levels utilized by the components of information handling system 100. PSU 190 can be included within a common chassis that includes the other components of system 100. Alternatively, PSU 190 can be located remote to system 100. In an embodiment, PSU 190 can include a microcontroller (not shown in FIG. 1), which can communicate with chipset 106 via SPI/I2C bus 160 or another type of bus interface. PSU 190 can be compliant with the one or more industry standards. In an embodiment, PSU 190 can be compliant with the PMBus standard, an open-standard digital power management protocol that facilitates communication with a power converter or other device by defining the transport and physical interface, as well as the command language needed to accomplish these definitions. The PMBus transport layer is based on the SMBus (System Management Bus), a version of the I2C serial bus that adds packet-error checking and host notification.

Memory 104 can include dynamic random-access memory (DRAM) and/or non-volatile dual in-line memory modules (NVDIMMs). NVDIMMs combine DRAM with non-volatile random-access memory (NVRAM), and can provide so-called persistent memory. For example, in response to a power failure, CPU 102 can utilize the limited energy available in a power supply to flush all processor caches to memory 104. Accordingly, PSU 190 must provide adequate stored energy to complete write-back cache flushing after mains power is lost. Information handling system 100 can then initiate a save operation whereby information stored at volatile memory within memory 104 is transferred to non-volatile memory at memory 104. An information handling system can include a backup power source, such as a battery, a super-capacitor, or a combination thereof to provide power needed to complete the save operation.

Figure 2:
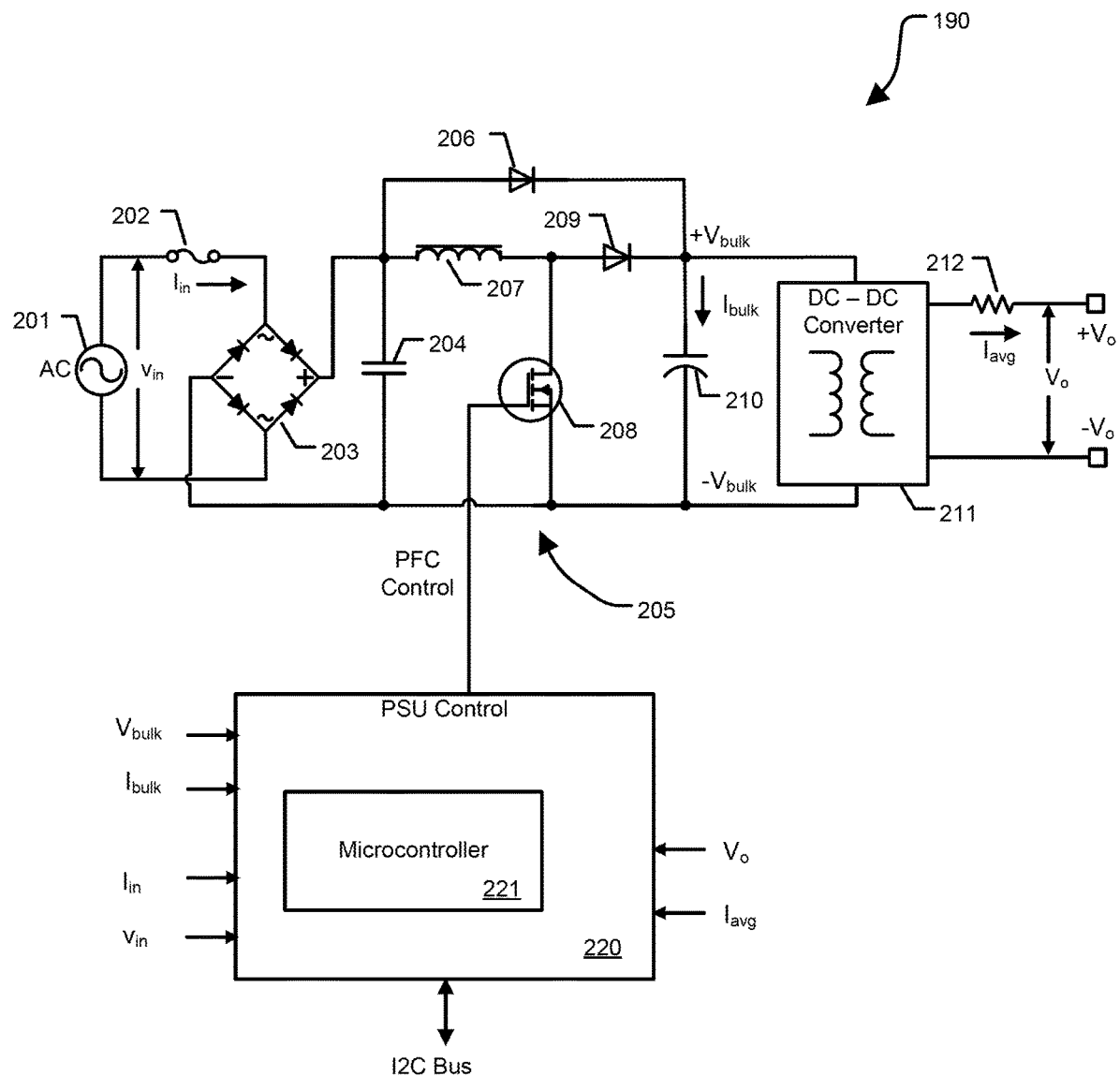
FIG. 2 is a block diagram of a power supply unit according to a specific embodiment of the present disclosure.

FIG. 2 shows PSU 190 according to a specific embodiment of the present disclosure. PSU 190 includes an input for receiving mains power 201, a fuse 202, a bridge rectifier 203, a capacitor 204, a power-factor correction (PFC) circuit 205 including a jump diode 206, a boost inductor 207, a boost transistor 208, a boost diode 209, a bulk capacitor 210.

PSU 190 further includes a DC-DC converter 211, a sense resistor 212, and a PSU control circuit 220. PSU Control circuit 220 includes a microcontroller 221. A magnitude of the mains power voltage is indicated by $V_{in}$, and a magnitude of mains current is indicated by $I_{in}$. PSU 190 generates output voltage $V_o$ that is provided to components of information handling system 100. A magnitude of current provided by PSU 190 to information handling system 100, indicated by $I_{avg}$, can be determined based on a voltage drop across sense resistor 212. A bulk voltage stored at bulk capacitor 210 is indicated by $+/-V_{bulk}$.

During operation, bridge rectifier 203 provides full-wave rectification of mains power 201 received via fuse 202. Capacitor 204 is connected across the output of rectifier 203 to provide high-frequency filtering. Direct current at the output of rectifier 203 is provided to PFC circuit 205. Jump diode 206 provides initial charging of bulk capacitor 210. PSU control circuit 220 can provide a pulse-width modulated control signal, labeled PFC Control in FIG. 2, to boost transistor 208. In a first mode of operation, PSU control circuit 220 can continuously adjust PFC control signal so that bulk voltage $V_{bulk}$ is maintained at a desired voltage level in response to variations in loading of PSU 190. DC-DC converter 211 receives bulk voltage $V_{bulk}$, which may be several hundred volts, and generates a direct current output $V_o$ at a voltage level needed by components of information handling system 100, such as twelve volts.

In a second mode of operation, PSU control circuit 220 is configured to perform operations to determine a capacitance of bulk capacitor 210. In one embodiment, PSU control circuit 220 can deactivate boost transistor 208 for a predetermined period of time, such as five milliseconds, thereby disabling the PFC circuit 205 from charging bulk capacitor 210 during the deactivated interval. During the period of time, PSU 200 continues to provide power to information handling system 100, partially discharging bulk capacitor 210, and causing voltage $V_{bulk}$ to decrease. PSU control circuit 220 can measure an initial value of voltage $V_{bulk}$ immediately prior to deactivating boost transistor 208 (Vbulk_ini) and measure a final value of voltage $V_{bulk}$ at the end of the interval (Vbulk_final). At the end of the time period, the PFC Control signal is reactivated and normal operation of PFC circuit 205 resumes. A difference between the values Vbulk_ini and Vbulk_final can be used to determine a capacitance of bulk capacitor 210 as described below. Alternatively, PSU control circuit 220 can determine the capacitance of bulk capacitor 210 based on a measurement of an alternating current flowing in bulk capacitor 210 and a measurement of an alternating voltage across bulk capacitor 210 during normal operation of information handling system, without deactivating boost transistor 208.

PSU 200 can include additional DC-DC converters, not shown in FIG. 2. For example, PSU 200 can include one or more DC-DC converters to supply stand-by power to information handling system when power provided by DC-DC converter 211 is disabled, and to supply housekeeping power to PSU 200, such as power provided to PSU control circuit 220. In an embodiment, PSU control circuit 220 can include a look-up table (not shown at FIG. 2) specifying an energy conversion efficiency of DC-DC converter 211 and other converters. The look-up tables can be stored during manufacture of PSU 200, or determined and stored by PSU control circuit during operation. The look-up table can specify the efficiency of each DC-DC converter expressed as a function of current provided by the converter, temperature of PSU 200, other operating parameters, or a combination thereof. For example, a look-up table can include entries specifying the energy conversion efficiency of DC-DC converter 211 for current loads ranging from 1% to 100% of a maximum supported load of the converter, in increments of 1% of load. PSU control circuit 220 can further include information quantifying the housekeeping power level. The operation of PSU 200 can be better understood with reference to FIGS. 3-5 below.

Figure 3:
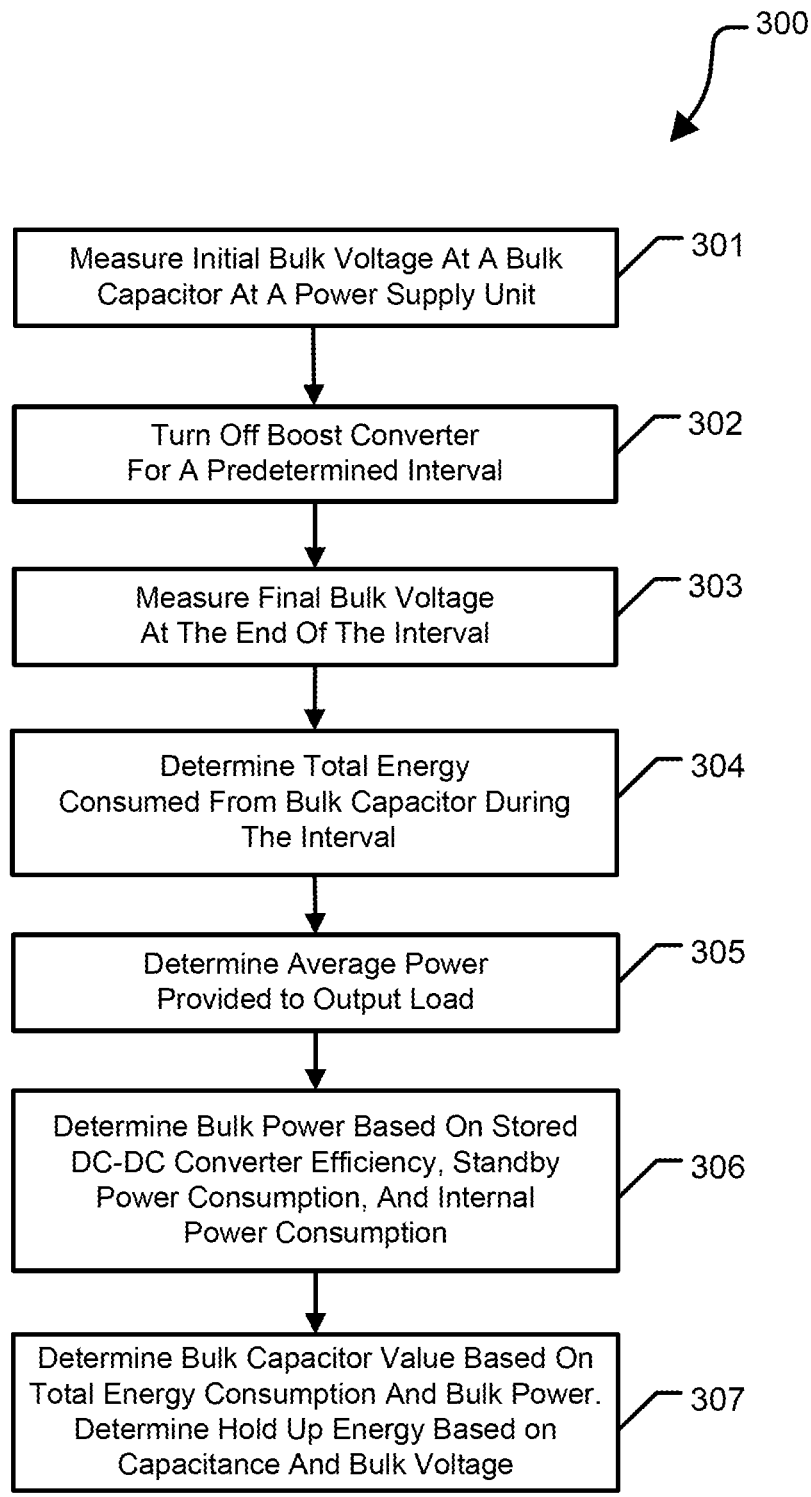
FIG. 3 is a flow diagram illustrating a method for determining a capacitance of a bulk capacitor at a power supply unit according to a specific embodiment of the present disclosure.

FIG. 3 shows a method 300 for determining a capacitance of bulk capacitor 210 at PSU 190 according to a specific embodiment of the present disclosure. Method 300 can be performed during normal operation of information handling system 100. Method 300 is performed on a single PSU at a time, and can be repeated for additional PSUs if applicable. For example, additional PSUs that are not the subject of a particular evaluation can be placed in a standby mode. If there is a sudden increase in the power consumption of information handling system 100, the method can be interrupted to avoid any disturbance of output voltage $V_o$. In an embodiment, the method can be performed while information handling system 100 is receiving power at a level greater than fifty percent of the rated power delivery capability of PSU 190.

Method 300 begins at block 301 where an initial voltage across bulk capacitor 210, Vbulk_ini, is measured. For example, PSU control circuit 220 can include an analog-to-digital converter (not shown at FIG. 2) that can be utilized by microcontroller 221 to determine a present value of bulk voltage $V_{bulk}$. Method 300 continues at block 302 where a boost converter at the PFC circuit 205 is deactivated for a predetermined period of time. For example, PSU control circuit 220 can deactivate boost transistor 208 for five milliseconds. While deactivated, information handling system 100 continues to consume power from PSU 190, depleting charge stored at bulk capacitor 210. At block 303, a final voltage at bulk capacitor 210, Vbulk_final, is measured, and PFC circuit 205 can resume normal operation, reestablishing a desired value of voltage $V_{bulk}$.

Method 300 continues at block 304 where a total amount of energy consumed during the deactivation interval is determined. For example, microcontroller 221 can calculate power provided by bulk capacitor 210 based on the measured values of Vbulk_ini, Vbulk_final, and the length of time that boost transistor 208 was deactivated:

$$Pbulk=[0.5 \times Cbulk \times (Vbulk\_ini^2 - Vbulk\_final^2)]/t \quad (1)$$

Equation 1 expresses power provided by bulk capacitor 210 based on the capacitance of bulk capacitor 210, Cbulk, the initial and final values of the voltage at bulk capacitor 210, Vbulk-ini and Vbulk_final, and the time, t, that boost transistor 208 was deactivated. A typical value of time, t, may be five milliseconds.

Method 300 proceeds to block 305 where an average power provided to a load at the output of PSU 190 during the deactivation interval is determined. For example, PSU control 220 can measure current $I_{avg}$ and voltage $V_o$ at the output of PSU 190 to determine power provided to the load at the output of PSU 190:

$$Pload\_output = V_o \times I_{avg} \quad (2)$$

Output voltage $V_o$ and output current $I_{avg}$ can be measured by PSU control circuit 220 throughout the deactivation interval, and an average value of the voltage and current can be calculated by microcontroller 221. At block 306, a total bulk power provided by PSU 190 is determined based on the average output power, Pload_output, in addition to power provided at a standby power converter, power consumed by PSU control circuit 220, referred to herein as housekeeping power, and other loads receiving power from PSU 190. In an embodiment, a total power associated with the standby power converter can be determined based on measuring current flowing in the primary circuit of the standby converter via a sense resistor, and a voltage at the input of the standby converter. The total bulk power can include power lost due to inefficiencies of DC-DC converter 211. For example, PSU control circuit 220 can include a look-up table that specifies the energy conversion efficiency of converter 211 based on the amount of power provided by converter 211.

$$P\text{bulk}=(P\text{load\_output}/n\text{dcdc\_\%\ Load})+P\text{standby}+P\text{housekeeping} \qquad (3)$$

The variable ndcdc_% Load is the efficiency of DC-DC converter 211 when delivering a particular amount of power to an output load, Pstandby is an amount of power provided to a standby power converter, and Phousekeeping is power consumed within PSU 190. In an embodiment, housekeeping power can be measured and stored at PSU control circuit 220 at the time of manufacture of PSU 190, measured by PSU control 220, or a combination thereof.

At block 307, the capacitance of bulk capacitor 210, Cbulk, can be determined based on equations 1 and 3:

$$C\text{bulk}=2\times P\text{bulk}\times t/(V\text{bulk\_ini}^2-V\text{bulk\_final}^2) \qquad (4)$$

A total amount of energy that can be provided by PSU 190 based on the capacitance of bulk capacitor 210, referred herein as a total hold-up energy, can be determined based on the capacitance of bulk capacitor 210, the initial voltage at bulk capacitor 210, and a minimum voltage at bulk capacitor necessary for PSU to provide proper voltage regulation, Vbulk_min:

$$E\text{tot}=\tfrac{1}{2}\times C\text{bulk}\times(V\text{bulk\_ini}^2-V\text{bulk\_min}^2) \qquad (5)$$

In an embodiment, Vbulk_min can be specified by the manufacturer and stored at a register at PSU control circuit 220. The total available energy Etot can be used to optimize performance of information handling system 100 as described below with reference to FIGS. 4 and 5.

Figure 4:
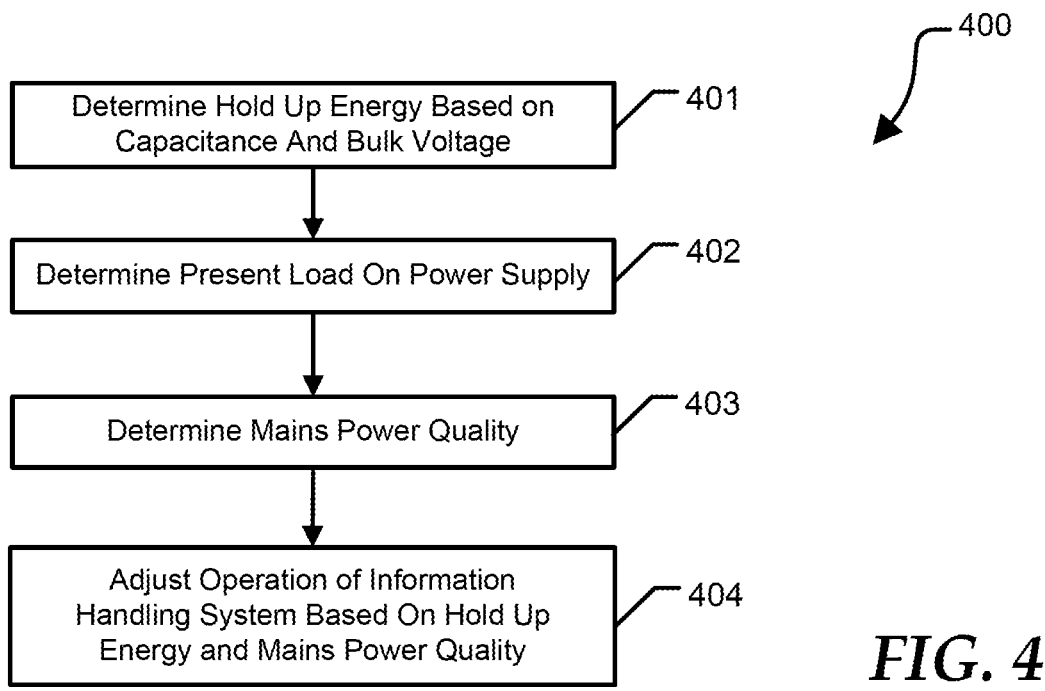
FIG. 4 is a flow diagram illustrating a method for adjusting operation of an information handling system according to a specific embodiment of the present disclosure.

FIG. 4 shows a method 400 for adjusting operation of information handling system 100 according to a specific embodiment of the present disclosure. In particular, method 400 illustrates tuning the operation of system 100 so that PSU 190 is capable of providing adequate operating power to system 100 to ride-through momentary disturbances in mains power. Method 400 begins at block 401 where the total hold-up energy of a power supply is determined. For example, method 300 can be used to determine total hold-up energy of PSU 190. At block 402, the current loading of the power supply is determined. For example, equation 3 can be used to determine Pbulk, representing a sum of all loads placed on PSU 190, both external and internal. The load on PSU 190 can vary over time based on computations and other activities performed by information handling system 100, and the load determined at block 402 can be inflated to take these factors into consideration. For example, the load can reflect a worst-case estimate of how much power may be consumed by system 100 during a disruption in mains power.

Method 400 continues at block 403 where a mains power quality is determined. In the present context, mains power quality is a measure of the duration of mains power interruptions or brown-outs, the latter including momentary reductions in the voltage of mains power. For example, mains power can be monitored to identify the frequency and duration of power interruptions. Method 400 concludes at block 404 where operation of an information handling system can be adjusted based on the hold-up energy and based on the mains power quality. For example, information handling system 100 can regulate the number of processors, processor cores, software tasks, fan speed, operating voltages, and the like, to select a total power consumption that can be reliably sustained throughout the duration of a momentary mains power interruption. Because the hold-up energy of PSU 190 has been accurately determined, the operating performance of system 100 can generally be increased relative to a system that relies merely on a worst-case estimate of the capacitance of bulk capacitor 210.

Figure 5:
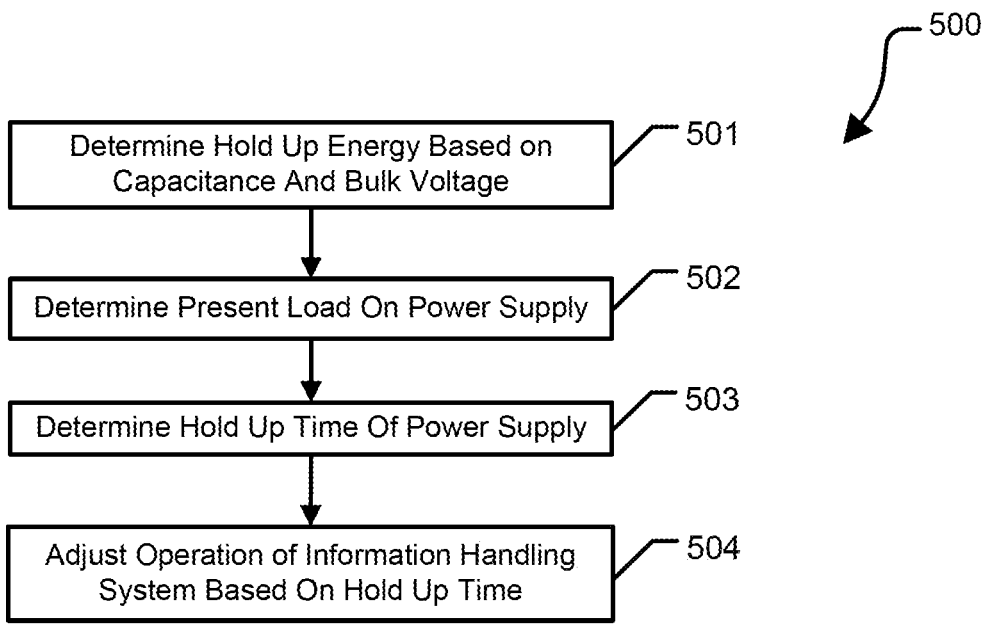
FIG. 5 is a flow diagram illustrating a method for adjusting the operation of an information handling system based on a hold-up time of a power supply unit according to a specific embodiment of the present disclosure.

FIG. 5 shows a method 500 for adjusting the operation of information handling system 100 based on a hold-up time of PSU 200 according to a specific embodiment of the present disclosure. In particular, method 500 illustrates a method for tuning the operation of system 100 so that PSU 190 is capable of providing adequate operating power following a loss of mains power to save processor state into persistent memory. Method 500 begins at block 501, similar to block 401 above, where the total hold-up energy of a power supply is determined. For example, method 300 can be used to determine total hold-up energy of PSU 190. At block 502, the current loading of the power supply is determined. For example, equation 3 can be used to determine Pbulk, representing a sum of all loads placed on PSU 190, both external and internal. At block 503, a total hold-up time of the PSU can be determined based on load presented to the PSU and the hold-up energy of the PSU. In other words, how long energy stored at bulk capacitor 210 can continue to provide power to information handling system 100 before the bulk voltage decreases to a value that causes PSU 190 to no longer provide a specified regulated voltage level. Method 500 concludes at block 504 where operation of the information handling system is adjusted based on the calculated hold-up time. For example, an allocation of write-back cache can be optimized so that the caches can be flushed to memory before the hold-up energy available in PSU 190 is exhausted.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
   measuring an initial voltage at a bulk capacitor of a power supply;
   controlling a power factor correction circuit to disable charging of the bulk capacitor for a predetermined period of time;
   measuring a final voltage at the bulk capacitor at completion of the period of time;
   determining a first average power provided to a load external to the power supply during the predetermined period of time;
   determining a capacitance of the bulk capacitor based on the initial voltage, the final voltage, and the first average power;
   determining a hold up time of the power supply based on the capacitance;
   determining a mains power quality based on measuring a duration and frequency of mains power interruptions; and
   adjusting a computational performance of an information handling system to decrease power consumed from the power supply based on the hold up time and based on the mains power quality.

2. The method of claim 1, further comprising:
   determining an energy conversion efficiency of a voltage converter based on the first average power; and
   determining the capacitance of the bulk capacitor further based on the energy conversion efficiency.

3. The method of claim 1, further comprising:
   determining a second average power provided to a load internal to the power supply;
   determining a third average power provided to a load by a second voltage converter; and
   determining the capacitance of the bulk capacitor further based on the second average power and the third average power.

4. The method of claim 1, further comprising determining the hold up time of the power supply based on the capacitance of the bulk capacitor and based on the first average power.

5. The method of claim 1, wherein adjusting the computational performance of the information handling system comprises adjusting a computing speed of a processor at the information handling system.

6. The method of claim 1, wherein adjusting the computational performance of the information handling system comprises adjusting a number of concurrent software processes executing at the information handling system.

7. The method of claim 1, wherein adjusting the computational performance comprises allocating a size of a cache memory system supporting write-back, the size to enable flushing cache data to a system memory during the hold up time.

8. A power supply comprising:
   a voltage rectifier;
   a power factor correction circuit to receive a first electric current from the voltage rectifier and to charge a bulk capacitor;

a voltage converter to receive a second electric current from the bulk capacitor and to generate an output electric current; and a microcontroller to:
measure an initial voltage at the bulk capacitor;
control the power factor correction circuit to disable charging of the bulk capacitor for a predetermined period of time;
measure a final voltage at the bulk capacitor;
determine a capacitance of the bulk capacitor based on the initial voltage and the final voltage;
determine a hold time of the power supply based on the capacitance of the bulk capacitor;
determine a mains power quality based on measuring a duration and frequency of mains power interruptions; and
provide the hold time and mains power quality to a processor included at an information handling system receiving power from the power supply, the processor to adjust a computational performance of the information handling system to decrease power consumed from the power supply based on the hold up time and based on the mains power quality.

9. The power supply of claim 8, wherein the microcontroller is further to:
determine a first average power provided to a load receiving power from the voltage converter, the load external to the power supply; and
determine the capacitance of the bulk capacitor further based on the first average power.

10. The power supply of claim 9, wherein the microcontroller is further to:
determine an energy conversion efficiency of the voltage converter based on the first average power;
determine the capacitance of the bulk capacitor further based on the energy conversion efficiency.

11. The power supply of claim 9, wherein the microcontroller is further to determine the hold up time of the power supply based on the capacitance of the bulk capacitor and based on the first average power.

12. The power supply of claim 9, wherein the microcontroller is further to:
determine a second average power provided to a load internal to the power supply;
determine a third average power provided to a load by a second voltage converter; and
determine the capacitance of the bulk capacitor further based on the second average power and the third average power.

13. The power supply of claim 8, wherein adjusting the computational performance of the information handling system comprises adjusting a computing speed of the processor.

14. The power supply of claim 8, wherein adjusting the computational performance of the information handling system comprises adjusting a number of concurrent software processes executing at the information handling system.

15. The power supply of claim 8, wherein adjusting the computational performance comprises allocating a size of write-back cache memory to permit flushing of the cache memory to a system memory during the hold up time.

16. An information handling system including:
a power supply comprising:
a power factor correction (PFC) circuit to receive a first electric current from a voltage rectifier, the PFC to charge a bulk capacitor;
a voltage converter to receive a second electric current from the bulk capacitor and to generate an output electric current; and
a microcontroller to:
determine a mains power quality based on measuring a duration and frequency of mains power interruptions;
measure an initial voltage at the bulk capacitor;
control the power factor correction circuit to disable charging of the bulk capacitor for a predetermined period of time;
measure a final voltage at the bulk capacitor;
determine a capacitance of the bulk capacitor based on the initial voltage and the final voltage; and
determine a hold up time of the power supply based on the capacitance; and
a processor to adjust a computational performance of the information handling system to decrease power consumed from the power supply based on the hold up time and based on the mains power quality.

17. The information handling system of claim 16, wherein adjusting the computational performance of the information handling system comprises adjusting a computing speed of the processor.

18. The information handling system of claim 16, wherein adjusting the computational performance of the information handling system comprises adjusting a number of concurrent software processes executing at the information handling system.

19. The information handling system of claim 16, wherein adjusting the computational performance comprises allocating a size of write-back cache memory to permit flushing of the cache memory to a system memory during the hold up time.

* * * * *